(12) United States Patent
Donohoo et al.

(10) Patent No.: US 10,160,152 B2
(45) Date of Patent: Dec. 25, 2018

(54) LONG FIBER EXTRUSION APPARATUS AND METHOD

(71) Applicant: Apex Business Holdings, L.P., Calvert City, KY (US)

(72) Inventors: Mark K. Donohoo, Calvert City, KY (US); Michael L. Walker, Paducah, KY (US); Michael A. Meredith, Paducah, KY (US); Jeffery H. West, Newburgh, IN (US); Steven W. Spahn, Evansville, IN (US)

(73) Assignee: Apex Business Holdings, L.P., Calvert City, KY (US)

( * ) Notice: Subject to any disclaimer, the term of this patent is extended or adjusted under 35 U.S.C. 154(b) by 111 days.

(21) Appl. No.: 15/360,191

(22) Filed: Nov. 23, 2016

(65) Prior Publication Data

US 2018/0141257 A1    May 24, 2018

(51) Int. Cl.
  *B29C 47/10*   (2006.01)
  *B29C 47/02*   (2006.01)
  *B29C 47/12*   (2006.01)
  *B29K 105/08*  (2006.01)

(52) U.S. Cl.
  CPC ........ *B29C 47/1045* (2013.01); *B29C 47/025* (2013.01); *B29C 47/12* (2013.01); *B29K 2105/08* (2013.01)

(58) Field of Classification Search
  CPC ... B29C 47/1045; B29C 47/025; B29C 47/12; B29K 2105/08
  See application file for complete search history.

(56) References Cited

U.S. PATENT DOCUMENTS

| | | | | | |
|---|---|---|---|---|---|
| 4,515,737 | A * | 5/1985 | Karino | ............... | B29C 47/0023 156/172 |
| 4,725,453 | A * | 2/1988 | Nakasone | ............... | B29C 70/08 264/1.29 |
| 4,875,757 | A * | 10/1989 | Greveling | ............ | G02B 6/4401 385/113 |
| 5,011,523 | A * | 4/1991 | Roncato | .................... | B29B 9/14 264/211.12 |
| 2003/0235688 | A1* | 12/2003 | Mizukami | ................. | B29B 9/14 428/402 |
| 2004/0026819 | A1* | 2/2004 | Lum | ..................... | B29B 13/025 264/230 |
| 2009/0258217 | A1* | 10/2009 | Hoefflin | .................. | C03C 25/18 428/325 |
| 2010/0064946 | A1* | 3/2010 | Watson | ............... | B29C 47/0021 108/57.25 |
| 2015/0376946 | A1* | 12/2015 | Kurzer | ..................... | E06C 1/12 182/194 |

(Continued)

*Primary Examiner* — Nahida Sultana

(74) *Attorney, Agent, or Firm* — Joseph M. Rolnicki; Evans & Dixon, L.L.C.

(57) ABSTRACT

A long fiber extrusion apparatus applies a polymer melt to a length of fiber using a die and an extruder where the length of fiber is directed to the die through a glass tube. The transparency of the glass tube enables viewing of the fiber as it is directed through the glass tube to monitor for any difficulties or problems encountered by the fiber passing through the glass tube. The glass interior surface of the glass tube reduces friction between the fiber and the glass surface and thereby reduces abrasion of the fiber and dust produced from abrasion of the fiber inside the glass tube.

20 Claims, 8 Drawing Sheets

(56) References Cited

U.S. PATENT DOCUMENTS

| | | | | |
|---|---|---|---|---|
| 2016/0303777 | A1* | 10/2016 | Miyauchi | C08J 5/24 |
| 2017/0153404 | A1* | 6/2017 | Takeda | G02B 6/4433 |
| 2017/0252967 | A9* | 9/2017 | Guillemette | B29C 64/118 |
| 2017/0305078 | A1* | 10/2017 | Chtourou | B29C 70/526 |
| 2017/0341300 | A1* | 11/2017 | Rudolph | B29C 64/386 |
| 2018/0036921 | A1* | 2/2018 | Green | B29C 47/02 |
| 2018/0045896 | A1* | 2/2018 | Wood | G02B 6/3817 |
| 2018/0080181 | A1* | 3/2018 | Hershberger | B29C 69/001 |

\* cited by examiner

LONG FIBER EXTRUSION APPARATUS AND METHOD

FIELD

This disclosure pertains to an apparatus and its method of operation in applying a polymer melt to a length of fiber using a die and an extruder where the length of fiber is directed to the die through a glass tube. The glass surface in the interior of the glass tube enables viewing of the fiber as it is directed through the glass tube to monitor for any difficulties or problems encountered by the fiber passing through the glass tube. The glass surface inside the glass tube also reduces friction between the fiber and the glass tube and thereby reduces abrasion of the fiber and dust produced from abrasion of the fiber inside the glass tube.

BACKGROUND

Plastic materials are used in the constructions of many different commercial products. The manufacturers of such products typically purchase plastic materials in the form of small pellets. The manufacturers heat the pellets to form a plastic melt, and then mold the parts of their products from the melt using any one of a variety of different conventional molding processes.

Some manufacturers produce plastic products that require additional strength than that provided by producing the products from plastic pellets alone. These manufacturers often use plastic pellets that have been reinforced by structures embedded inside the plastic pellets for manufacturing their products. For example, plastic pellets are produced with small lengths of fibers, for example glass fibers or carbon fibers inside the pellets. The fibers in the pellets reinforce the pellets and provide additional strength to the pellets than that provided by plastic pellets alone.

In the manufacture of plastic pellets reinforced with fibers, long lengths of the fibers are typically stored at the manufacturing facility on spools. A length of fiber from each of the spools is pulled from the spool into and through a die. The die could have one interior chamber and a single fiber could be pulled through the one interior chamber. The die could have a plurality of interior chambers and a fiber could be pulled through each of the plurality of interior chambers.

An extruder communicates with the one or more interior chambers of the die and the lengths of fiber(s) pulled through the interior chambers. The extruder extrudes plastic melt into the die where the plastic melt coats the fibers being pulled through the die. The length of fibers, now coated with the plastic melt are pulled from the die and the plastic coating the fibers is allowed to cool.

The lengths of fibers with the now cooled plastic coating are pulled into a pelletizer where the lengths of fibers and their plastic coating are cut into pellets. Reinforced pellets produced in this manner can have a variety of sizes and are typically very small, for example the size of a drug capsule.

To increase the fiber reinforced pellet manufacturing capacity of an extrusion apparatus such as that described above, it would be necessary to increase the number of spools of fibers and the number of lengths of fibers pulled into the die. However, the spools of fibers are typically very large. The size of the spools prevents them from being positioned in close proximity to the die and the spools must be positioned some distance from the die. As the lengths of fibers on the spools are pulled from the spools and toward the die the fibers can become entangled or can be damaged in some way before they enter the die. Entanglement of the multiple lengths of fibers would require a shut down of the extrusion apparatus until the multiple lengths of fibers are untangled. Additionally, damage occurring to any of the multiple lengths of fibers prior to the lengths of fibers entering the die can result in plastic pellets being produced containing damaged portions of fibers which would result in less than the desired strength of the commercial product produced from the pellets.

SUMMARY

The long fiber extrusion apparatus and its method of operation of this disclosure directs lengths of fibers as they are pulled from spools to a die and protects the lengths of fibers from the spools to the die. The long fiber extrusion apparatus prevents entanglement of the lengths of fibers pulled from the spools to the die and prevents damage to the lengths of fibers as they are pulled from the spools to the die.

The long fiber extrusion apparatus employs at least one tube that extends from a spool of fiber to the die of the apparatus. If a plurality of spools of fibers are used by the long fiber extrusion apparatus, then a plurality of tubes are incorporated into the construction of the apparatus.

Each tube of the plurality of tubes has a length with opposite proximal and distal ends. Each tube has an interior surface that surrounds a tube bore inside the tube. The interior surface of the tube bore extends completely through the tube from the proximal end of the tube to the distal end of the tube. The tube bore is dimensioned to receive a length of fiber from a spool at the proximal end of the tube. The interior bore supports the length of fiber in sliding engagement on the interior surface as the length of fiber is pulled through the bore. The tube bore dispenses the length of fiber at the distal end of the tube positioned adjacent the die of the extrusion apparatus.

The tube is constructed of glass and the interior surface of the tube is a glass surface. The tube being constructed of glass enables the length of fiber pulled through the tube bore to be observed by an individual from the exterior of the tube. This enables an individual to monitor for any problems experienced by the length of fiber being pulled through the tube bore. The interior surface of the bore being a glass surface reduces friction between the length of fiber being pulled through the tube bore and the interior surface of the tube. The reduction of friction avoids abrasion of the length of fiber pulled through the tube bore and the creation of dust in the tube bore from the abrasion.

When the long fiber extrusion apparatus is employed with a plurality of spools of fibers, a plurality of tubes are incorporated into the apparatus. The proximal ends of the tubes are positioned adjacent the spools. The plurality of tubes extend from their proximal ends adjacent the spools to their distal ends adjacent the die. The lengths of the plurality of tubes are straight and converge as they extend from the plurality of spools to the die. The straight configurations of the plurality of tubes prevents the lengths of fibers being pulled through the tubes from becoming entangled as they converge toward the die.

With the pluralities of tubes of the long fiber extrusion apparatus having the constructions described above, the tubes prevent the entanglement of the lengths of fibers pulled to the die. The tubes also prevent abrasion of the lengths of fibers and the dust created by abrasion resulting from friction between the lengths of fibers pulled through the bores of the tubes and the interior surfaces of the tubes.

Further features of the long fiber extrusion apparatus of this disclosure are set forth in the drawing figures and the following detailed description of the apparatus.

DETAILED DESCRIPTION

The long fiber extrusion apparatus 12 of this disclosure employs many component parts of conventional extrusion apparatus. Because these conventional component parts are well known in the art, they will not be described in detail herein.

The long fiber extrusion apparatus 12 basically takes several strands or lengths of fiber, for example fiberglass fiber, carbon fiber, stainless steel fiber, rayon fiber, synthetic fiber, natural fiber, or any other equivalent type of fiber and applies a coating material, for example a polymer coating around each length of fiber. The lengths of fiber are then cooled and cut into small pellets. These small pellets are later used to mold parts of products by putting the pellets into a mold and heating the mold to melt the coating material. The part produced by the molding process has a much greater strength than constructing the part of the coating material alone. The small lengths of fiber in the pellets intertwine as the part is molded and reinforce the part.

Use of the word "fiber" herein is not only intended to mean any type of fiber material, but also any type of fiber construction from a single strand up to 1000 or even 30,000 strands intertwined in a yarn or tow. A typical fiber has about a 6 µm diameter and is smaller than a human hair.

Figure 1:
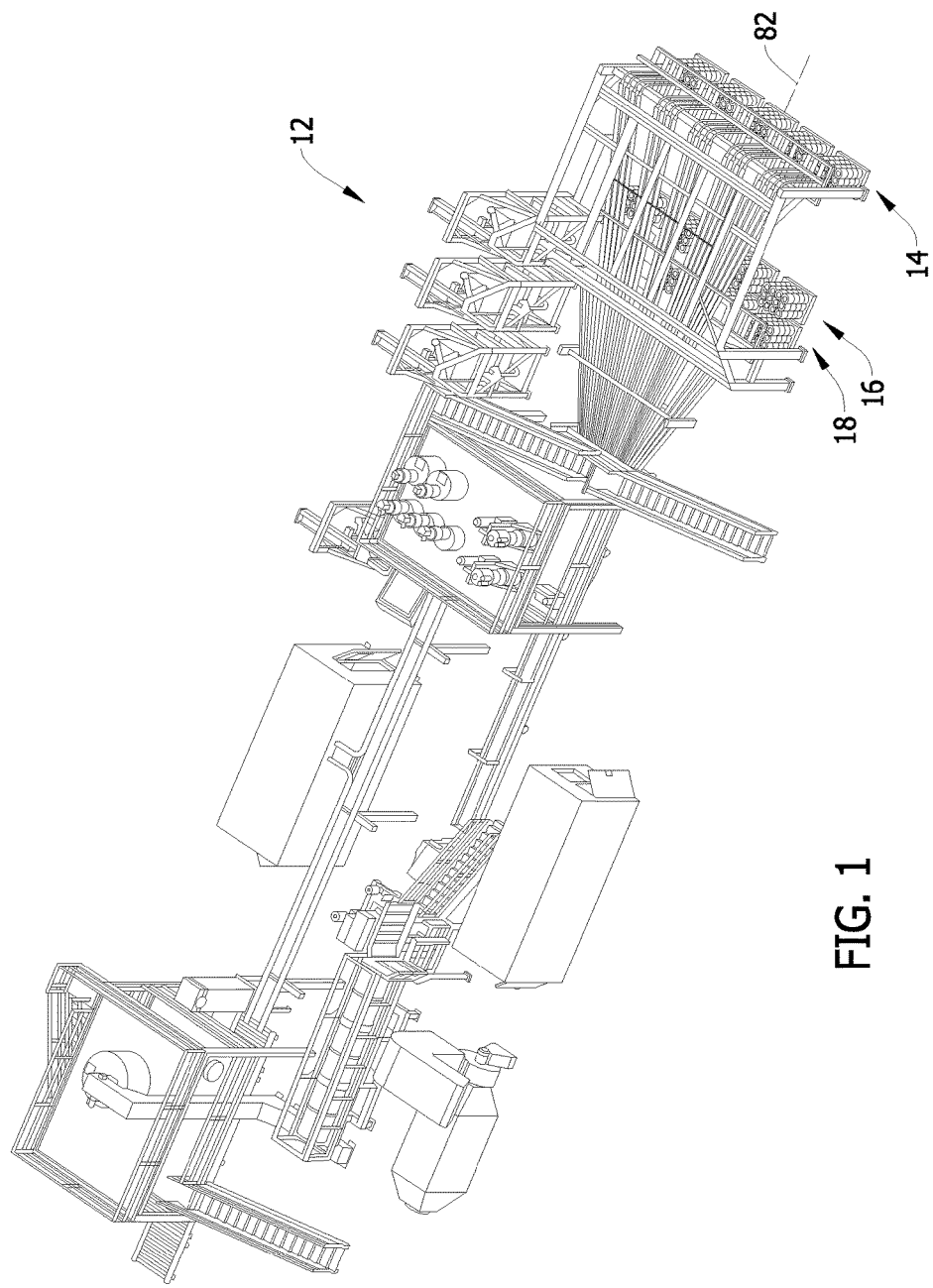
FIG. 1 is a top, perspective view of the modular long fiber extrusion apparatus.
Figure 2:
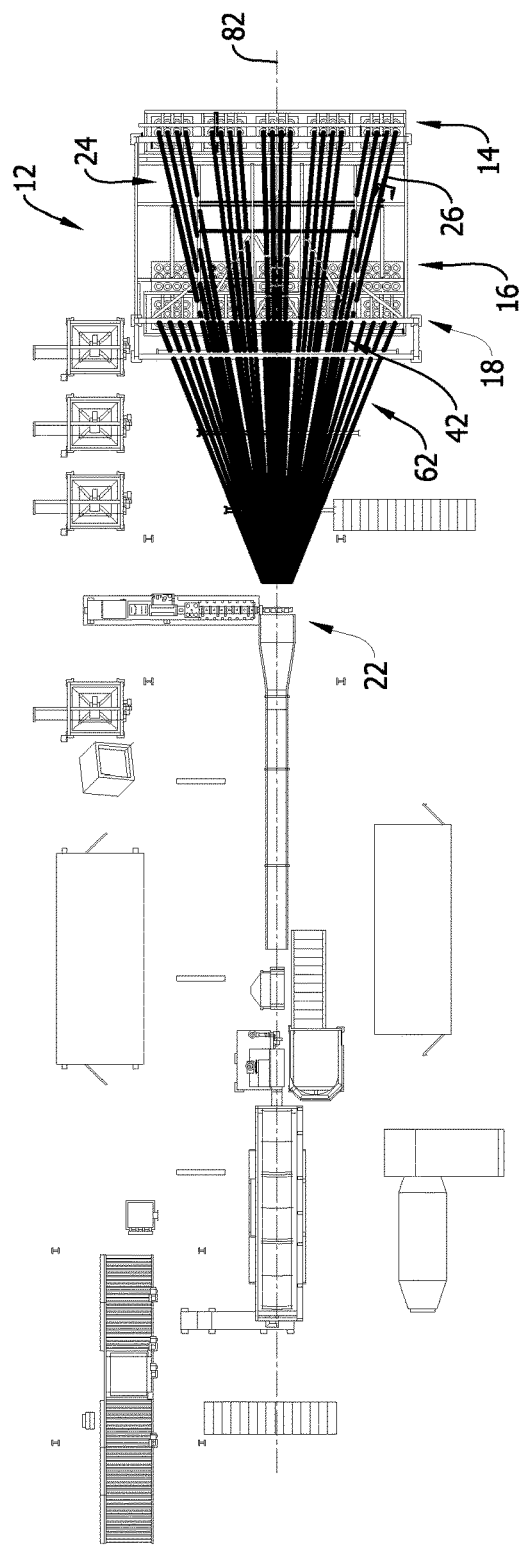
FIG. 2 is a top plan view of the modular long fiber extrusion apparatus.
Figure 3:
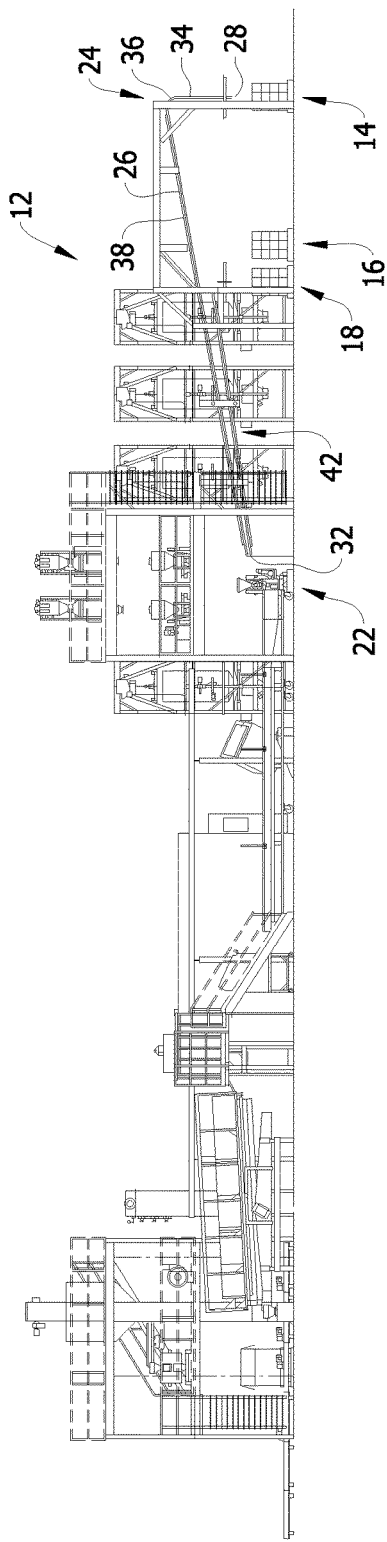
FIG. 3 is a side elevation view of one side of the modular long fiber extrusion apparatus.

Referring to FIGS. 1-3, the long fiber extrusion process performed by the long fiber extrusion apparatus 12 moves from right to left.

To the right of the long fiber extrusion apparatus 12 are three groups of pallets supporting spools 14, 16, 18. Each of the groups of pallets and spools 14, 16, 18 includes spools of fiber, for example fiberglass fiber, carbon fiber, stainless steel fiber, rayon fiber synthetic or natural fiber. Other equivalent types of fibers could be employed with the apparatus 12. As represented in FIGS. 1-3, the pallets in each group of pallets and spools 14, 16, 18 are large and support several spools of fibers. The size of the pallets and spools 14, 16, 18 prevents them from being positioned in close proximity to the die 22 and the pallets and spools 14, 16, 18 must be positioned some distance from the die 22. The pallets of each group 14, 16, 18 are positioned side-to-side with the groups of pallets and spools 14, 16, 18 traversing the length of the extrusion apparatus 12 and being centered relative to the extrusion apparatus 12. The arrangement of the groups of pallets and spools 14, 16, 18 relative to the apparatus 12 facilitates the pulling of lengths of fibers from the spools supported on the pallets to the die 22 of the apparatus 12, as will be explained.

FIGS. 4-8 represent components of a system that protects the fibers as they are directed to the die 22. To simplify the description of the system, the system is represented in FIGS. 4-8 as directing fibers from only two groups of pallets and spools 14, 16 to the die 22.

A first plurality of tubes 24 extends from the first group of pallets and spools 14 to the die 22. The construction of each of the tubes of the first plurality of tubes 24 is the same, and therefore, only one tube 26 will be described in detail.

Figure 5:
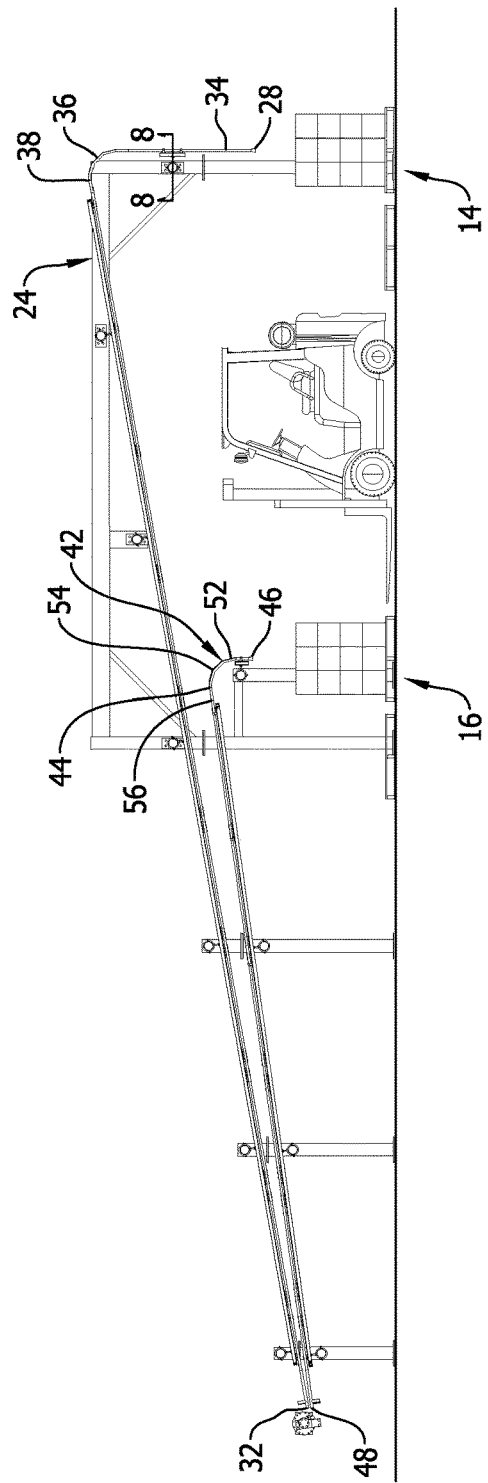
FIG. 5 is an enlarged partial side elevation view of the right side of the apparatus represented in FIG. 3.
Figure 6:
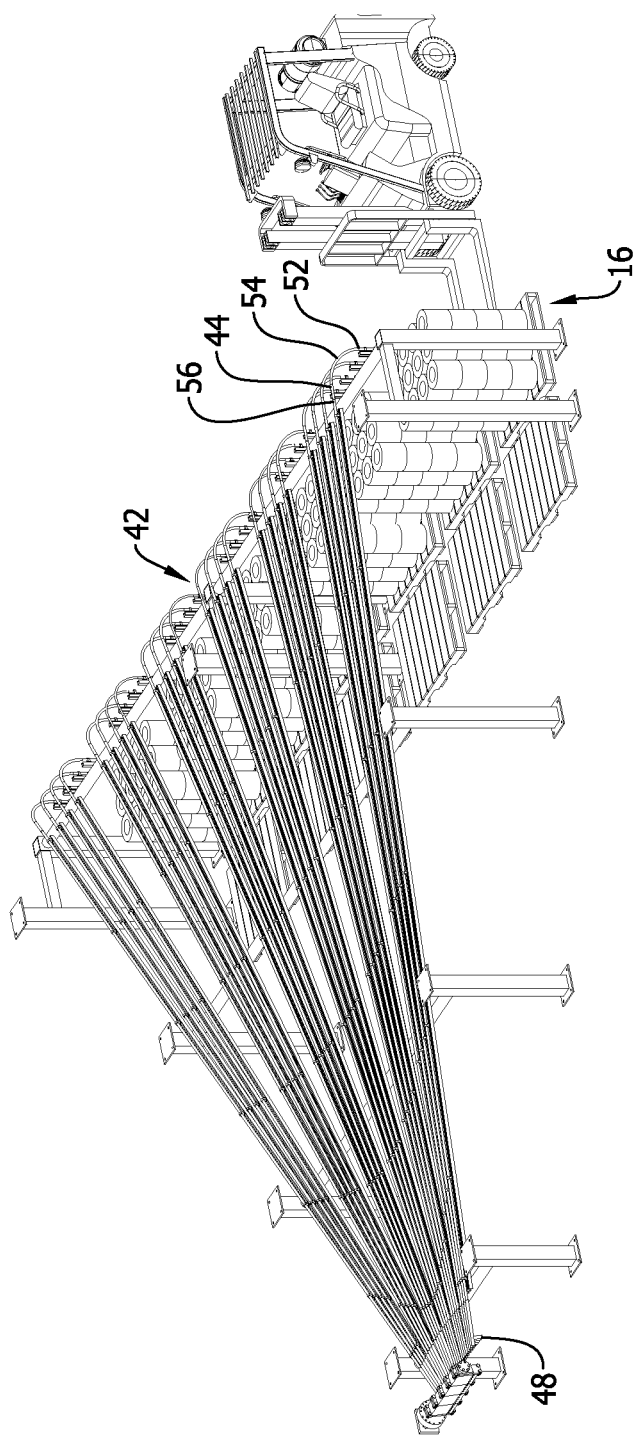
FIG. 6 is a representation of a perspective view of a forward, lower portion of the apparatus represented in FIGS. 4 and 5.
Figure 7:
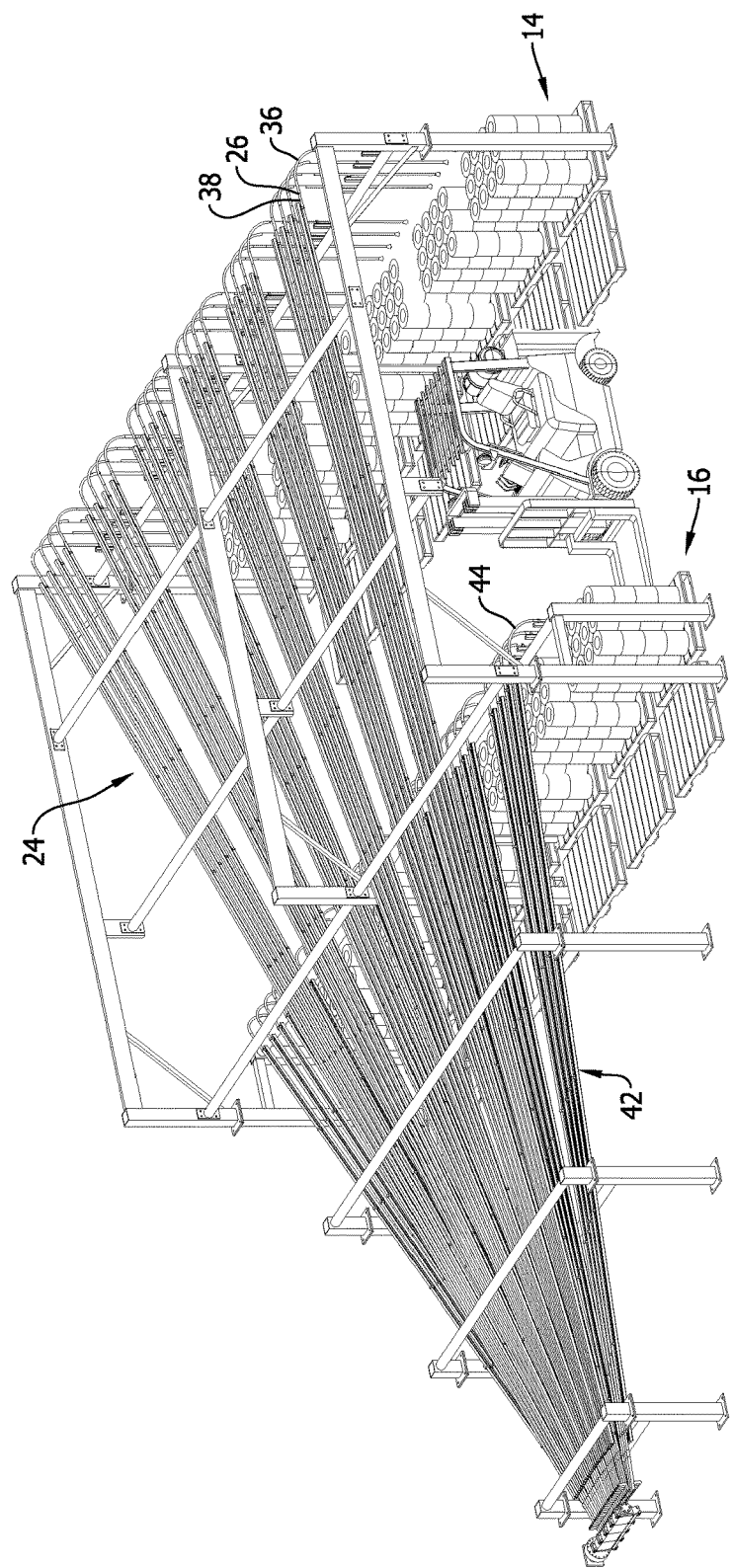
FIG. 7 is a representation of the lower and upper portions of the apparatus represented in FIGS. 4 and 5.
Figure 8:
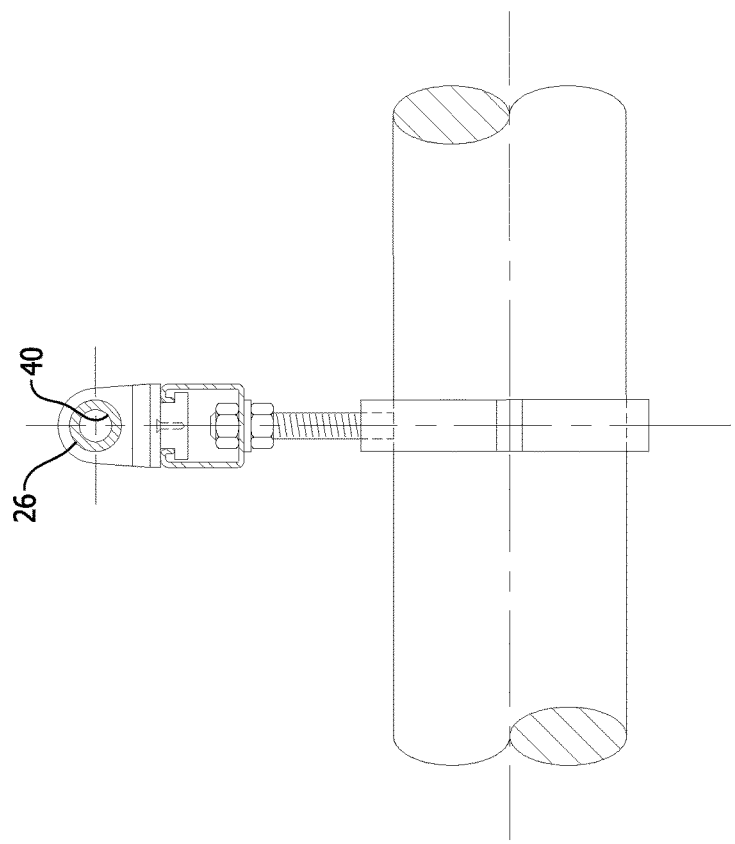
FIG. 8 is a representation of an enlarged, cross-section view of one tube of the plurality of tubes of the apparatus.

The first tube 26 has a length between a proximal end 28 and a distal end 32 of the tube. As represented in FIG. 5, the proximal end 28 of the first tube 26 is flared and is positioned directly above a pallet and spools of the first group 14. A first portion 34 of the first tube 26 extends straight, vertically upward from the proximal end 28 of the first tube 26. The first tube 26 then extends through a large, gradual bend portion 36 to a second portion 38 of the first tube. The second portion 38 of the first tube 26 is straight as it extends from the bend 36 to the distal end 32 of the first tube. The straight length of the second portion 38 of the first tube makes up a majority of the length of the first tube 26 between the proximal end 28 of the first tube and the distal end 32 of the first tube. The straight, vertical first portion 34 of the first tube positions the straight, second portion 38 of the first tube well above the second group of pallets and spools 16 and the third group of pallets and spools 18.

The first tube 26 is cylindrical along its entire length and has a cylindrical tube bore that extends through the length of the first tube 26 from the proximal end 28 to the distal end 32. The first tube 26 is transparent and is constructed entirely of glass that enables viewing the tube bore from the exterior of the first tube. The glass construction of the first tube 26 also provides a cylindrical interior surface 40 surrounding the tube bore that is glass. This is represented in the cross-section of the first tube in FIG. 8. The glass interior surface 40 of the tube bore reduces friction between a length of fiber being drawn through the first tube 26 and the interior surface 40 of the first tube. The reduction of friction between the length of fiber drawn through the first tube 26 and the interior surface 40 of the first tube reduces abrasion of the length of fiber being drawn through the first tube and reduces dust from accumulating in the tube bore of the first tube from abrasion. In the long fiber extrusion apparatus 12 represented in the drawing figures, the tube bore of the first tube 26 is dimensioned to receive a single length of fiber at the proximal end 28 of the first tube and to support the length of fiber in sliding engagement on the interior surface 40 of the tube bore until the length of fiber is dispensed from the tube bore at the distal end 32 of the first tube. In other embodiments of the apparatus, the tube bore could be dimensioned to receive multiple lengths of fiber at the proximal end of the tube bore, and support the multiple lengths of fiber in sliding engagement on the interior surface of the tube bore until the multiple lengths of fiber are dispensed at the distal end of the first tube.

A second plurality of tubes 42 extends from the second group of pallets and spools 16 to the die 22. The construction of each of the tubes of the second plurality of tubes 42 is the same, and is very similar to the construction of each of the tubes of the first plurality of tubes 24. Therefore, only one of the second tubes 44 will be described in detail.

The second tube 44 has a length between a proximal end 46 and a distal end 48 of the tube. As represented in FIG. 5, the proximal end 46 of the second tube 44 is flared and is positioned directly above a pallet and spools of the second group 16. A first portion 52 of the second tube 44 extends straight, vertically upward from the proximal end 46 of the second tube 44. The second tube 44 then extends through a large, gradual bend portion 54 to a second portion 56 of the second tube. The second portion 56 of the second tube 44 is straight as it extends from the bend 54 to the distal end 48 of the second tube. The distal end 48 of the second tube 44 is positioned adjacent the distal end 32 of the first tube 26. The straight length of the second portion 56 of the second tube 44 makes up a majority of the length of the second tube 44 between the proximal end 46 of the second tube and the distal end 48 of the second tube. As represented in FIG. 3, the straight, vertical first portion 52 of the second tube 44 positions the straight, second portion 56 of the second tube well above the third group of pallets and spools 18 and just below the first plurality of tubes 24.

The second tube 44 is cylindrical along its entire length and has a cylindrical tube bore that extends through the length of the second tube 44 from the proximal end 46 to the distal end 48. The second tube 44 is transparent and is constructed entirely of glass that enables viewing the tube bore from the exterior of the second tube. The glass construction of the second tube 44 also provides a cylindrical interior surface surrounding the tube bore that is glass. The glass interior surface of the tube bore reduces friction between a length of fiber drawn through the second tube 44 and the interior surface of the second tube. The reduction of friction between the length of fiber drawn through the second tube 44 and the interior surface of the second tube reduces abrasion of the length of fiber being drawn through the second tube and reduces dust from accumulating in the tube bore of the second tube from abrasion. In the long fiber extrusion apparatus 12 represented in the drawing figures, the tube bore of the second tube 44 is dimensioned to receive a single length of fiber at the proximal end 36 of the second tube and to support the length of fiber in sliding engagement on the interior surface of the tube bore until the length of fiber is dispensed from the tube bore at the distal end 48 of the second tube. In other embodiments of the apparatus, the tube bore could be dimensioned to receive multiple lengths of fiber at the proximal end of the tube bore, and support the multiple lengths of fiber in sliding engagement on the interior surface of the tube bore until the multiple lengths of fiber are dispensed at the distal end of the second tube.

A third plurality of tubes 62 is represented in FIG. 2 extending from the third group of pallets and spools 18 to the die 22. The construction of each of the tubes of the third plurality of tubes 62 is the same. Additionally, the construction of each tube of the third plurality of tube 62 is substantially the same as the construction of each of the tubes of the first plurality of tubes 24 and the second plurality of tubes 42. Each third tube has a length between a proximal end and a distal end of the tube. The proximal end of each third tube is positioned directly above a pallet and spools of the third group 18. A first portion of each third tube extends straight, vertically upward from the proximal end of the third tube. Each third tube then extends through a large, gradual bend portion to a second portion of the third tube. The second portion of each third tube is straight as it extends from the bend to the distal end of the third tube. The distal end of each third tube is positioned adjacent the distal end 32 of the first tube 26 and the distal end 48 of the second tube 44. The straight length of the second portion of each third tube makes up the majority of the length of the third tube 64 between the proximal end of the third tube and the distal end of the third tube. The straight, vertical first portion of each third tube positions the straight, second portion of the third tube just below the second plurality of tubes 42.

Each third tube is cylindrical along its length and has a cylindrical tube bore that extends through the length of the third tube from the proximal end to the distal end. Each third tube is transparent and is constructed entirely of glass that enables viewing the tube bore from the exterior of the third tube. The glass construction of each third tube also provides a cylindrical interior surface surrounding the tube bore that is glass. The glass interior surface of each third tube bore reduces friction between a length of fiber being drawn through each third tube and the interior surface of each third tube. The reduction of friction between the length of fiber drawn through each third tube 64 and the interior surface 78 of each third tube reduces abrasion of the length of fiber being drawn through the third tube and reduces dust from accumulating in the tube bore of each third tube from abrasion. In the long fiber extrusion apparatus 12 represented in the drawing figures, the tube bore of each third tube is dimensioned to receive a single length of fiber at the proximal end of each third tube and to support the length of fiber in sliding engagement on the interior surface of the tube bore until the length of fiber is dispensed from the tube bore at the distal end of each third tube. In other embodiments of the apparatus, the tube bore could be dimensioned to receive multiple lengths of fiber at the proximal end of the tube bore, and support the multiple lengths of fiber in sliding engagement on the interior surface of the tube bore until the multiple lengths of fiber are dispensed at the distal end of the third tube.

Figure 4:
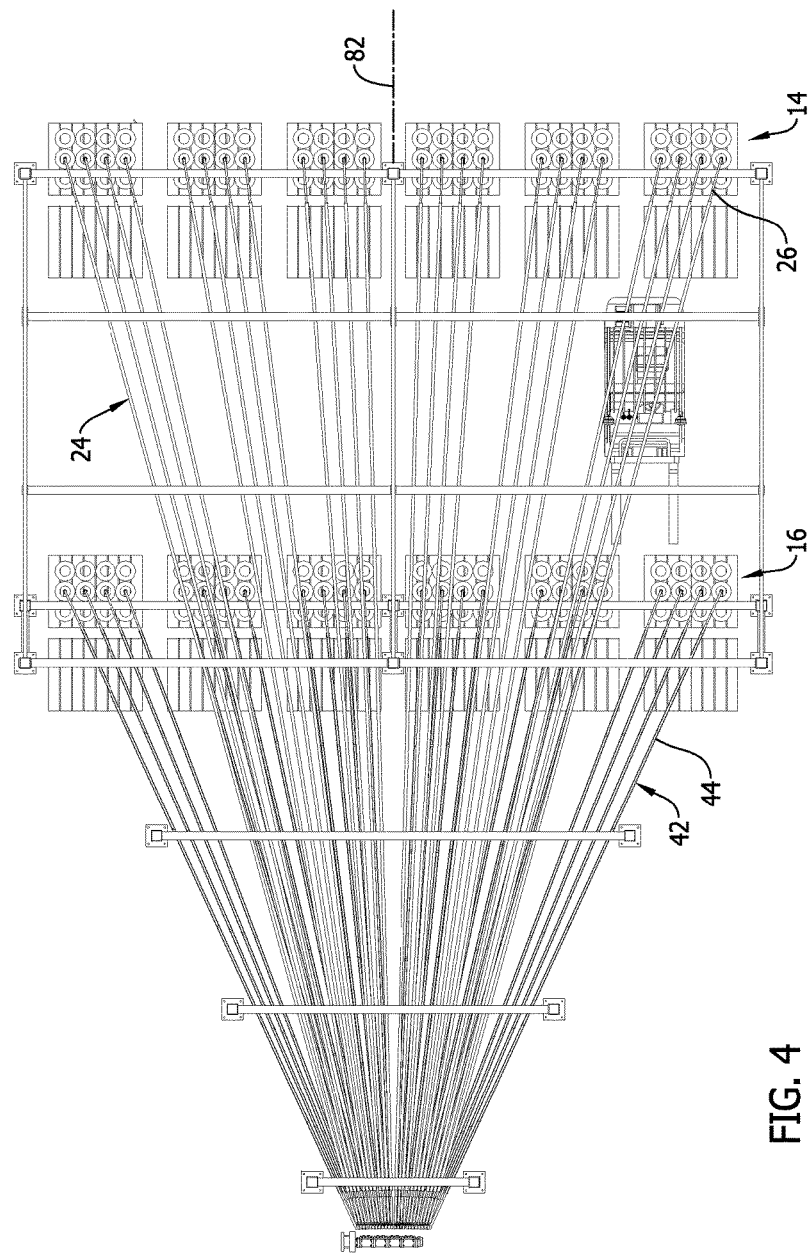
FIG. 4 is an enlarged, partial top plane view of the right side of the modular apparatus represented in FIG. 2.

As represented in the drawing figures, the pluralities of first tubes 24, second tubes 42 and third tubes all converge downwardly as their lengths extend to the respective distal ends 32, 48, where the distal ends are positioned in a single horizontal plane adjacent the die 22 of the apparatus 12. As represented in FIGS. 1, 2 and 4, the pluralities of first tubes 24, second tubes 42 and third tubes 62 also converge toward a center line 82 of the die 22 as the tubes extend to their respective distal ends 32, 48. The relative positions of the plurality of tubes 24, 42, 62 and the convergence of the tubes as they extend to the die 22 prevent entanglement of the lengths of fibers pulled from the spools of the three groups of pallets and spools 14, 16, 18 to the die 22 and prevents damage to the lengths of fibers as they are pulled from the spools to the die. The pluralities of tubes 24, 42, 62 being constructed of glass enables viewing of the fibers as they are directed through the glass tubes to monitor for any difficulties or problems encountered by the fibers passing through the glass tubes. The glass surfaces inside the pluralities of glass tubes 24, 42, 62 also reduce friction between the fibers and the glass tubes and thereby reduce abrasion of the fibers and dust produced from abrasion of the fibers inside the glass tubes.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A fiber extrusion apparatus comprising:
a plurality of tubes, at least one tube of the plurality of tubes having a length with opposite proximal and distal ends, the at least one tube having an interior surface that surrounds at least one tube bore inside the at least one tube, the interior surface and the at least one tube bore extend completely through the at least one tube from the proximal end of the tube to the distal end of the tube, the tube bore is dimensioned to receive a length of fiber at the proximal end of the tube and to support the length of fiber in sliding engagement on the interior surface of the tube bore and to dispense the length of fiber at the distal end of the at least one tube, the interior surface of the at least one tube being a glass surface;
a die adjacent to the distal end of the at least one tube, the die having an interior chamber; and,
an extruder adjacent the die, the extruder communicating with the interior chamber of the die.

2. The fiber extrusion apparatus of claim 1, further comprising;
the length of fiber being a length of fiber from a group comprising fiberglass fiber, carbon fiber, stainless steel fiber, rayon fiber, synthetic fiber, natural fiber and their equivalents.

3. The fiber extrusion apparatus of claim 1, further comprising:
the at least one tube bore being dimensioned to receive a plurality of lengths of fibers at the proximal end of the at least one tube and to support the plurality of lengths of fibers in sliding engagement on the interior surface of the at least one tube bore and to dispense the plurality of lengths of fibers at the distal end of the at least one tube.

4. The fiber extrusion apparatus of claim 1, further comprising:
a majority of the length of the at least one tube is straight.

5. A fiber extrusion apparatus, comprising:
a tube having a length with opposite proximal and distal ends, the tube having an interior surface that surrounds a, tube bore inside the tube, the interior surface and the tube bore extend completely through the tube from the proximal end of the tube to the distal end of the tube, the tube bore is dimensioned to receive a length of fiber at the proximal end of the tube and to support the length of fiber in sliding engagement on the interior surface of the tube bore and to dispense the length of fiber at the distal end of the tube, the interior surface of the tube being a glass surface;
a die adjacent to the distal end of the tube, the die having an interior chamber;
an extruder adjacent the die, the extruder communicating with the interior chamber of the die; and,
the tube being one of a plurality of tubes, each tube of the plurality of tubes having a length with opposite proximal and distal ends, each tube of the plurality of tubes having an interior surface that surrounds a tube bore inside each tube, the interior surface inside each tube and the tube bore inside each tube extending completely through each tube from the proximal end of each tube to the distal end of each tube, each tube being dimensioned to receive a length of fiber at the proximal end of each tube and to support the length of fiber in sliding engagement on the interior surface of each tube bore and to dispense the length of fiber at the distal end of each tube, the interior surface of each tube bore being a glass surface.

6. The fiber extrusion apparatus of claim 5, further comprising:
the plurality of tubes converge as the lengths of the plurality of tubes extend from the proximal ends of the plurality of tubes to the distal ends of the plurality of tubes.

7. The fiber extrusion apparatus of claim 6, further comprising:
the distal ends of the plurality of tubes are positioned in a single horizontal plane.

8. The fiber extrusion apparatus of claim 7, further comprising:
the die having a center line; and,
the distal ends of the plurality of tubes are centered relative to the center line of the die.

9. The fiber extrusion apparatus of claim 5, further comprising:
the interior chamber of the die is one of a plurality of interior chambers, each interior chamber of the plurality of interior chambers being aligned with the distal end of each tube of the plurality of tubes.

10. The fiber extrusion apparatus of claim 9, further comprising:
the extruder communicating with each interior chamber of the plurality of interior chambers.

11. A fiber extrusion apparatus comprising:
a plurality of tubes, at least one tube of the plurality of tubes having a length with opposite proximal and distal ends, the at least one tube having an interior surface that surrounds a tube bore inside the at least one tube, the interior surface and the at least one tube bore extend completely through the at least one tube from the proximal end of the at least one tube to the distal end of the at least one tube, the at least one tube bore is dimensioned to receive a length of fiber at the proximal end of the at least one tube and to support the length of fiber in sliding engagement on the interior surface of the tube bore and dispense the length of fiber at the distal end of the at least one tube, the at least one tube being transparent;
a die adjacent the distal end of the at least one tube, the die having an interior chamber; and,
an extruder adjacent the die, the extruder communicating with the interior chamber of the die.

12. The fiber extrusion apparatus of claim 11, further comprising:
the length of fiber being a length of fiber from a group comprising fiberglass fiber, carbon fiber, stainless steel fiber, rayon fiber, synthetic fiber, natural fiber and their equivalents.

13. The fiber extrusion apparatus of claim 11, further comprising:
the tube bore being dimensioned to receive a plurality of lengths of fibers at the proximal end of the at least one tube and to support the plurality of lengths of fibers in sliding engagement on the interior surface of the tube bore and to dispense the plurality of lengths of fibers at the distal end of the at least one tube.

14. The fiber extrusion apparatus of claim 11, further comprising:
a majority of the length of the at least one tube is straight.

15. A fiber extrusion apparatus comprising:
a tube having a length with opposite proximal and distal ends, the tube having an interior surface that surrounds a tube bore inside the tube, the interior surface and the tube bore extend completely through the tube from the proximal end of the tube to the distal end of the tube, the tube bore is dimensioned to receive a length of fiber at the proximal end of the tube and to support the length of fiber sliding engagement on the interior surface of the tube bore and dispense the length of fiber at the distal end of the tube, the tube being transparent;

a die adjacent the distal end of the tube, the die having an interior chamber;

an extruder adjacent the die, the extruder communicating with the interior chamber of the die; and, the tube being one of a plurality of tubes, each tube of the plurality of tubes having a length with opposite proximal and distal ends, each tube of the plurality of tubes having an interior surface that surrounds a tube bore inside each tube, the interior surface inside each tube and the tube bore inside each tube extending completely through each tube from the proximal end of each tube to the distal end of each tube, each tube being dimensioned to receive a length of fiber at the proximal end of each tube and to support the length of fiber in sliding engagement on the interior surface of each tube bore and to dispense the length of fiber at the distal end of each tube, the interior surface of each tube bore being a glass surface.

16. The fiber extrusion apparatus of claim 15, further comprising:

the plurality of tubes converge as the lengths of the plurality of tubes extend from the proximal ends of the plurality of tubes to the distal ends of the plurality of tubes.

17. The fiber extrusion apparatus of claim 16, further comprising:

the distal ends of the plurality of tubes are positioned in a single horizontal plane.

18. The fiber extrusion apparatus of claim 17, further comprising:

the die having a center line; and, the distal ends of the plurality of tubes are centered relative to the center line of the die.

19. The fiber extrusion apparatus of claim 15, further comprising:

the interior chamber is one of a plurality of interior chambers, each interior chamber of the plurality of interior chambers being aligned with the distal end of each tube of the plurality of tubes.

20. The fiber extrusion apparatus of claim 19, further comprising:

the extruder communicating with each interior chamber of the plurality of interior chambers.

* * * * *